US012386972B2

(12) United States Patent
Mallya (10) Patent No.: US 12,386,972 B2
(45) Date of Patent: *Aug. 12, 2025

(54) CLUSTER SECURITY BASED ON VIRTUAL MACHINE CONTENT (71) Applicant: INTERNATIONAL BUSINESS MACHINES CORPORATION, Armonk, NY (US)

(72) Inventor: Shailaja Mallya, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/840,848

(22) Filed: Jun. 15, 2022

(65) Prior Publication Data
US 2022/0309167 A1 Sep. 29, 2022

Related U.S. Application Data (63) Continuation of application No. 16/691,804, filed on Nov. 22, 2019, now Pat. No. 11,334,672.

(51) Int. Cl.
G06F 21/57 (2013.01)
G06F 21/62 (2013.01)

(52) U.S. Cl.
CPC ........ *G06F 21/577* (2013.01); *G06F 21/6218* (2013.01)

(58) Field of Classification Search
CPC .................. G06F 21/577; G06F 21/6218
See application file for complete search history.

(56) References Cited

U.S. PATENT DOCUMENTS 9,021,546 B1 4/2015 Banerjee
9,223,972 B1 12/2015 Mncent et al.
(Continued)

FOREIGN PATENT DOCUMENTS

CN 103457933 A 12/2013
CN 106383735 A 2/2017
(Continued)

OTHER PUBLICATIONS

"Implementing Multi Level Security in cognitive computing (data mining)," IP.com Prior Art Database Technical Disclosure, IP.com No. IPCOM000257559D, Feb. 19, 2019, 6 pages, https://ip.com/IPCOM/000257559.
Mell et al., "The NIST Definition of Cloud Computing: Recommendations of the National Institute of Standards and Technology," U.S. Department of Commerce, Special Publication 800-145, Sep. 2011, 7 pages.
Mallya, "Cluster Security Based On Virtual Machine Content," U.S. Appl. No. 16/691,804, filed Nov. 22, 2019.
(Continued)

*Primary Examiner* — Meng Li
(74) *Attorney, Agent, or Firm* — Jeffrey Ingalls (57) ABSTRACT A cluster is scanned. The cluster includes one or more virtual machines. A first content file change is detected based on the scan of the cluster. The first content file change is to a first content file. The first content file is located on a first virtual machine related to the cluster. A content-based security level of the cluster is determined based on the detection of the first content file change. The determined content-based security level of the cluster is compared to a security level standard of the cluster. A security gap is identified based on the comparison of the determined content-based security level to the security level standard of the cluster. In response to the identification of the security gap, an update to the security settings of the cluster is performed.

15 Claims, 6 Drawing Sheets

(56) References Cited

U.S. PATENT DOCUMENTS

| | | | |
|---|---|---|---|
| 9,800,606 B1* | 10/2017 | Yumer | H04L 63/1416 |
| 10,375,115 B2 | 8/2019 | Mallya | |
| 10,484,334 B1 | 11/2019 | Lee et al. | |
| 2006/0021041 A1* | 1/2006 | Challener | G06F 21/80 |
| | | | 726/24 |
| 2010/0251363 A1* | 9/2010 | Todorovic | G06F 21/56 |
| | | | 718/1 |
| 2012/0030187 A1* | 2/2012 | Marano | G06F 16/986 |
| | | | 707/E17.014 |
| 2012/0072968 A1 | 3/2012 | Wysopal et al. | |
| 2012/0131676 A1 | 5/2012 | Iwata | |
| 2012/0174095 A1 | 7/2012 | Natchadalingam et al. | |
| 2012/0291133 A1* | 11/2012 | Nagpal | G06F 21/6218 |
| | | | 726/26 |
| 2013/0055398 A1* | 2/2013 | Li | G06F 21/577 |
| | | | 726/25 |
| 2014/0026231 A1 | 1/2014 | Barak et al. | |
| 2014/0033194 A1 | 1/2014 | Natchadalingam et al. | |
| 2014/0053226 A1 | 2/2014 | Fadida et al. | |
| 2014/0096134 A1 | 4/2014 | Barak et al. | |
| 2014/0106787 A1* | 4/2014 | Hangai | H04M 1/72463 |
| | | | 455/566 |
| 2014/0201732 A1 | 7/2014 | Haag et al. | |
| 2016/0149769 A1 | 5/2016 | Joshi et al. | |
| 2016/0232024 A1* | 8/2016 | Hamilton | G06F 21/53 |
| 2017/0279826 A1* | 9/2017 | Mohanty | G06F 9/505 |
| 2018/0034856 A1 | 2/2018 | Mallya | |
| 2018/0115586 A1 | 4/2018 | Chou et al. | |
| 2019/0014023 A1* | 1/2019 | Gupta | H04L 41/0659 |
| 2019/0171620 A1 | 6/2019 | McCollum et al. | |
| 2019/0354675 A1 | 11/2019 | Gan et al. | |
| 2020/0257811 A1* | 8/2020 | Tatarinov | G06F 11/3684 |

FOREIGN PATENT DOCUMENTS

| | | |
|---|---|---|
| CN | 109379347 A | 2/2019 |
| CN | 110474913 A | 11/2019 |
| CN | 114641771 A | 6/2022 |
| DE | 112020004806 T5 | 6/2022 |
| GB | 2604820 A | 9/2022 |
| JP | 2011123695 A | 6/2011 |
| JP | 2013003602 A | 1/2013 |
| JP | 2013511770 A | 4/2013 |
| JP | 2023-502343 A | 1/2023 |
| WO | 2011062743 A2 | 5/2011 |
| WO | 2021/099959 A1 | 5/2021 |

OTHER PUBLICATIONS

List of IBM Patents or Patent Applications Treated as Related, Dated Jun. 8, 2022, 2 pages.

International Searching Authority, "Notification of Transmittal of the International Search Report and the Written Opinion of the International Searching Authority, or Declaration," Patent Cooperation Treaty, Feb. 25, 2021, 10 pages, International Application No. PCT/IB2020/060862.

Decision to Grant a Patent drafted Apr. 9, 2024 from Japanese Patent Application No. 2022-527046 filed May 10, 2022, 2 pps.

The State Intellectual Property Office of People's Republic of China, "The First Office Action", Aug. 15, 2024, 13 Pages, CN Application No. 202080077408.2.

The State Intellectual Property Office of People's Republic of China, "Notification of Grant", Jan. 7, 2025, 5 Pages, CN Application No. 202080077408.2.

* cited by examiner

CLUSTER SECURITY BASED ON VIRTUAL MACHINE CONTENT

BACKGROUND

The present disclosure relates to virtualized computing, and more specifically, to adjusting virtual machine security.

Virtual machines may operate to serve various content and services to users. The virtual machines may be created with certain security settings. In some instances, the role, the workflow, or content stored on a virtual machine may change. These changes can lead to situations where the security setting of the virtual machine does not match the workload of the virtual machine.

SUMMARY

According to embodiments of the present disclosure, is a method, system, and computer program of virtual machine security. A cluster is scanned. The cluster includes one or more virtual machines. A first content file change is detected based on the scan of the cluster. The first content file change is to a first content file. The first content file is located on a first virtual machine related to the cluster. A content-based security level of the cluster is determined based on the detection of the first content file change. The determined content-based security level of the cluster is compared to a security level standard of the cluster. A security gap is identified based on the comparison of the determined content-based security level to the security level standard of the cluster. In response to the identification of the security gap an update to the security settings of the cluster is performed.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to virtualized computing; more particular aspects relate to adjusting virtual machine security. While the present disclosure is not necessarily limited to such applications, various aspects of the disclosure may be appreciated through a discussion of various examples using this context.

Virtual machines and virtualized systems can allow for additional computing flexibility. Historically it took time to build hardware, install software, and assign rights and privileges for accessing and operating computer systems. Virtual machines can allow for computing devices to be assigned to tasks quickly by virtualizing the underlying computer hardware. Further, operating systems and other core computer resources can be imaged such that they can be instanced, quickly installed, and provided to users for computer usage.

This flexibility and speed can lead to security issues in some instances. For example, virtual machines or clusters of virtual machines can operate on data or provide computer resources with inadequate security. The lack of security can lead to data loss to third-party bad actors or inadvertent data exposure to the public.

In some cases, the attempt to fix these security issues has been to implement a set of rules, policies, or standards. The virtual machines may be assigned a fixed security level standard. A security level standard may be a policy, role, or other fixed set of security settings that may be applied to the virtual machine without regard to the content or workload of the virtual machine or other virtual machines. This may lead to problems as the security level standard may be insecure as the workload changes. For example, a datastore and associated virtual machine may be added to a cluster that operates on secure data. Because the cluster has a predetermined security level standard that is fixed, the virtual machine may be vulnerable to security breaches from a third-party bad actor.

In some cases, virtual machine clusters have tried to preemptively escalate security of various virtual machines. For example, the various virtual machines of a cluster may be elevated in security level standard. For example, if a first virtual machine of a cluster has a lower security level standard than the other virtual machines, the cluster may operate by escalating the security level of the virtual machine to the same security level as other virtual machines. Escalating of a security level standard may be done regardless of the content of the virtual machines within the cluster. Escalating of a security level standard may be based solely on a security level standard, policy, or other fixed set of rules. These operations may only operate to ratchet up security, which can cause computer resource constraints of the cluster. For example, to perform more elevated security operations, higher levels of encryption may be used. The increased security may use excessive computer processing, memory, input output ("I/O") and in some cases increased usage of each of these resources.

To overcome the current issues related to computer virtualization, content-based dynamic virtual machine security ("CDVS") may be implemented. CDVS may operate by continuously monitoring and gathering content-based insights on the data being operated on by each virtual machine in a cluster. The content-based insights may be performed on a first virtual machine of a cluster in isolation. For example, any data that is received by, accessible to, or created by a first virtual machine may be analyzed in determining the security level of the first virtual machine. The content-based insights may be performed by analyzing a cumulative data set of multiple virtual machines of a cluster. For example, any data or content of all virtual machines of the cluster in combination may be analyzed in determining the security level of all the virtual machines of the cluster.

The CDVS may operate by increasing the security level of the cluster including one or more virtual machines of the cluster based on the content analysis. For example, if one or more virtual machines are operating on sensitive data, the CDVS may operate by identifying the content as particularly sensitive or secure. The CDVS may responsively escalate, based on the content, the security settings of the virtual machines of the cluster. The dynamic escalation of multiple systems can create advanced security within a virtual machine cluster. For example, a change in the security level of a single VM could mandate all the VMs in the cluster to also be updated to that new security level. The other systems in the cluster should not be at a lower security level as they become a target for an attacker to gain access to the cluster network. The CDVS may operate by decreasing the security level of the cluster including one or more virtual machines of the cluster based on the content analysis. For example, if the virtual machines are operating on non-sensitive data, the CDVS may operate by identifying the content as not particularly sensitive or private. The CDVS may responsively de-escalate, based on the content, the security settings of the virtual machines of the cluster.

The escalation and de-escalation of the security settings may be completed regardless of the security level standard of one or more virtual machines of the cluster. For example, if a first virtual machine has been set up with a high level of security at a first time, the first virtual machine may operate with heightened security rules, consequently utilizing large amounts of processing and memory of the underlying computer hardware. The CDVS may, based on content insights of the first virtual machine, determine the first virtual machine is not operating on data that necessitates advanced security. The CDVS may operate based on a multi-level analysis. The first level may include gathering of data within each virtual machine. The second level may include the data/insights generated across the cluster, to produce a cumulative insight. The cumulative insight may dictate the level of security compliance for the cluster.

The operation of the CDVS may provide advanced compliance and security for administrators of virtual machines and virtual machine clusters. By operating on an insights system, the CDVS may make policy and security changes to virtual machines without exposing the underlying content of the virtual machines of a given cluster to any human operators. Further, the CDVS may permit users to administer the security level of virtual machines and clusters, even in situations where the users do not have authority to access the content or the insights generated from the content. Further, the CDVS may operate to alert the system admin of the change in security level of the cluster based on new data added to, or existing data deleted from, individual virtual machines. In some embodiments, the CDVS may utilize the content-based analysis and insight generation to make security level suggestions to an administrator of the cluster. For example, an administrator may receive a notification to reduce a security level of a cluster from the CDVS based on analysis of the content and a determination that the security level is using excessive resources.

The CDVS may operate based on the content that exists at a given moment on a cluster. The CDVS may operate based on a virtual machine receiving a new piece of content from a user or other computer system. The CDVS may operate based on the sharing of or privacy level of content on the virtual machines of the cluster. For example, a first virtual machine may be hosting a file sharing service for a user. The user may be only sharing the file with a small group of other users. The CDVS may, responsive to scanning the sharing settings of the file, determine that the security settings for the cluster should be elevated. If the user alters the sharing settings of the file such that the file is publicly available on the Internet, the CDVS may detect this content-level change. Responsive, to detecting the public sharing of the file, the CDVS may determine that content is of a lower security level and reduce the security settings of the cluster.

The CDVS may be configured to scan various log files, content files, or other files to determine the context. In some embodiments, a natural language processing system may include various components' (not depicted) operation through hardware, software, or in some combination: for example, a natural language processor, one or more data sources, a search application, and a report analyzer. The natural language processor may be a computer module that analyzes the received content and other information. The natural language processor may perform various methods and techniques for analyzing textual information (e.g., syntactic analysis, semantic analysis, etc.). The natural language processor may be configured to recognize and analyze any number of natural languages. In some embodiments, the natural language processor may parse passages of documents or content from one or more virtual machines of a cluster. Various components (not depicted) of the natural language processor may include, but are not limited to, a tokenizer, a part-of-speech (POS) tagger, a semantic relationship identifier, and a syntactic relationship identifier.

In some embodiments, the tokenizer may be a computer module that performs lexical analyses. The tokenizer may convert a sequence of characters into a sequence of tokens. A token may be a string of characters included in an electronic document and categorized as a meaningful symbol. Further, in some embodiments, the tokenizer may identify word boundaries in an electronic document and break any text passages within the document into their component text elements, such as words, multiword tokens, numbers, and punctuation marks. In some embodiments, the tokenizer may receive a string of characters, identify the lexemes in the string, and categorize them into tokens.

Consistent with various embodiments, the POS tagger may be a computer module that marks up a word in passages to correspond to a particular part of speech. The POS tagger may read a passage or other text in natural language and assign a part of speech to each word or other token. The POS tagger may determine the part of speech to which a word (or other text element) corresponds based on the definition of the word and the context of the word. The context of a word may be based on its relationship with adjacent and related words in a phrase, sentence, or paragraph.

In some embodiments, the context of a word may be dependent on one or more previously analyzed electronic documents (e.g., the usage and relative placement of a word within a first virtual machine as compared to other virtual machines of a cluster). Examples of parts of speech that may be assigned to words include, but are not limited to, nouns, verbs, adjectives, adverbs, and the like. Examples of other part of speech categories that POS tagger may assign include, but are not limited to, comparative or superlative adverbs, wh-adverbs, conjunctions, determiners, negative particles, possessive markers, prepositions, wh-pronouns, and the like. In some embodiments, the POS tagger may tag or otherwise annotate tokens of a passage with part of speech categories. In some embodiments, the POS tagger may tag tokens or words of a passage to be parsed by the natural language processing system.

In some embodiments, the semantic relationship identifier may be a computer module that may be configured to identify semantic relationships of recognized text elements (e.g., words, phrases) in documents. In some embodiments, the semantic relationship identifier may determine functional dependencies between entities and other semantic relationships.

Consistent with various embodiments, the syntactic relationship identifier may be a computer module that may be configured to identify syntactic relationships in a passage composed of tokens. The syntactic relationship identifier may determine the grammatical structure of sentences such as, for example, which groups of words are associated as phrases and which word is the subject or object of a verb. The syntactic relationship identifier may conform to formal grammar.

In some embodiments, the natural language processor may be a computer module that may parse a document and generate corresponding data structures for one or more portions of the document. For example, in response to receiving an updated document on a virtual machine at the natural language processing system, the natural language processor may output parsed text elements from the post as data structures. In some embodiments, a parsed text element may be represented in the form of a parse tree or other graph structure. To generate the parsed text element, the natural language processor may trigger computer modules including the tokenizer, the part-of-speech (POS) tagger, the semantic relationship identifier, and the syntactic relationship identifier.

Each computing system of the CDVS may have a cognitive agent/client running on it. The cognitive agents of the CDVS may be trained on various models before being implemented. For example, there can be a pre-defined set of security policies for protecting data belonging to different industries. The cognitive agent may be trained to know the different set of security policies available on the system. The cognitive agent may be trained to know which policy is more stringent and choose the more stringent of the policies as its output. Next, the cognitive agent may be trained to generate models for different industry sectors (e.g., finance, health, etc.). For example, for text data, the model may be trained to recognize the key words present in the data or insights for a particular industry. In some embodiments, a cognitive agent may create an association of the security levels to different industries. For example, if one of the security levels/policies available on the system is for the PCI (Payment Card Industry) compliance standard, then all financial key words may be associated with this security policy.

Figure 1:
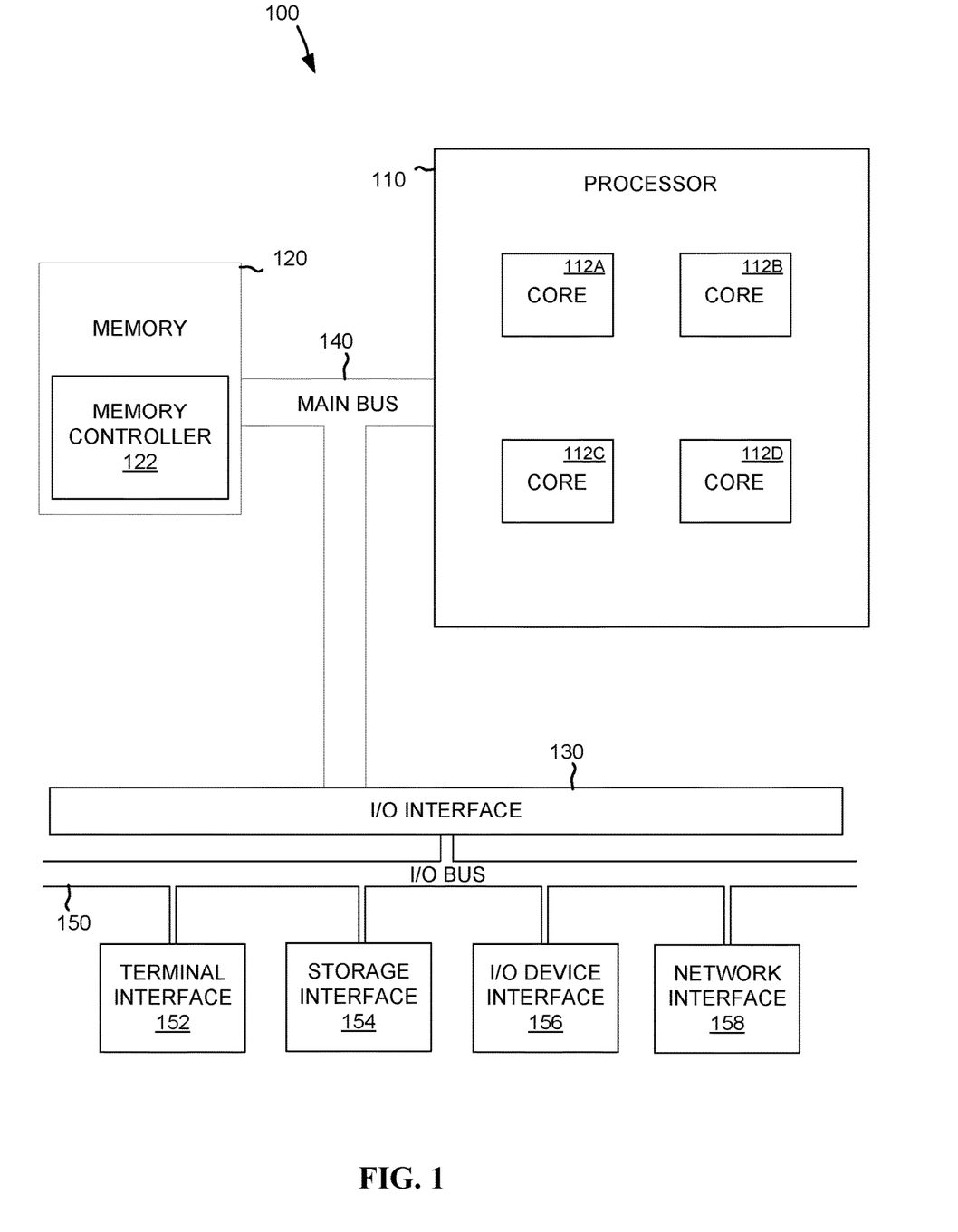
FIG. 1 depicts the representative major components of an example computer system that may be used, in accordance with some embodiments of the present disclosure.

FIG. 1 depicts the representative major components of an example computer system 100 (alternatively, computer) that may be used, in accordance with some embodiments of the present disclosure. It is appreciated that individual components may vary in complexity, number, type, and\or configuration. The particular examples disclosed are for example purposes only and not necessarily the only such variations. The computer system 100 may comprise a processor 110, memory 120, an input/output interface (herein I/O or I/O interface) 130, and a main bus 140. The main bus 140 may provide communication pathways for the other components of the computer system 100. In some embodiments, the main bus 140 may connect to other components such as a specialized digital signal processor (not depicted).

The processor 110 of the computer system 100 may be comprised of one or more cores 112A, 112B, 112C, 112D (collectively 112). The processor 110 may additionally include one or more memory buffers or caches (not depicted) that provide temporary storage of instructions and data for the cores 112. The cores 112 may perform instructions on input provided from the caches or from the memory 120 and output the result to caches or the memory. The cores 112 may be comprised of one or more circuits configured to perform one or more methods consistent with embodiments of the present disclosure. In some embodiments, the computer system 100 may contain multiple processors 110. In some embodiments, the computer system 100 may be a single processor 110 with a singular core 112.

The memory 120 of the computer system 100 may include a memory controller 122. In some embodiments, the memory 120 may comprise a random-access semiconductor memory, storage device, or storage medium (either volatile or non-volatile) for storing data and programs. In some embodiments, the memory may be in the form of modules (e.g., dual in-line memory modules). The memory controller 122 may communicate with the processor 110, facilitating storage and retrieval of information in the memory 120. The memory controller 122 may communicate with the I/O interface 130, facilitating storage and retrieval of input or output in the memory 120.

The I/O interface 130 may comprise an I/O bus 150, a terminal interface 152, a storage interface 154, an I/O device interface 156, and a network interface 158. The I/O interface 130 may connect the main bus 140 to the I/O bus 150. The I/O interface 130 may direct instructions and data from the processor 110 and memory 120 to the various interfaces of the I/O bus 150. The I/O interface 130 may also direct instructions and data from the various interfaces of the I/O bus 150 to the processor 110 and memory 120. The various interfaces may include the terminal interface 152, the storage interface 154, the I/O device interface 156, and the network interface 158. In some embodiments, the various interfaces may include a subset of the aforementioned interfaces (e.g., an embedded computer system in an industrial application may not include the terminal interface 152 and the storage interface 154).

Logic modules throughout the computer system 100— including but not limited to the memory 120, the processor 110, and the I/O interface 130—may communicate failures and changes to one or more components to a hypervisor or operating system (not depicted). The hypervisor or the operating system may allocate the various resources available in the computer system 100 and track the location of data in memory 120 and of processes assigned to various cores 112. In embodiments that combine or rearrange elements, aspects and capabilities of the logic modules may be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
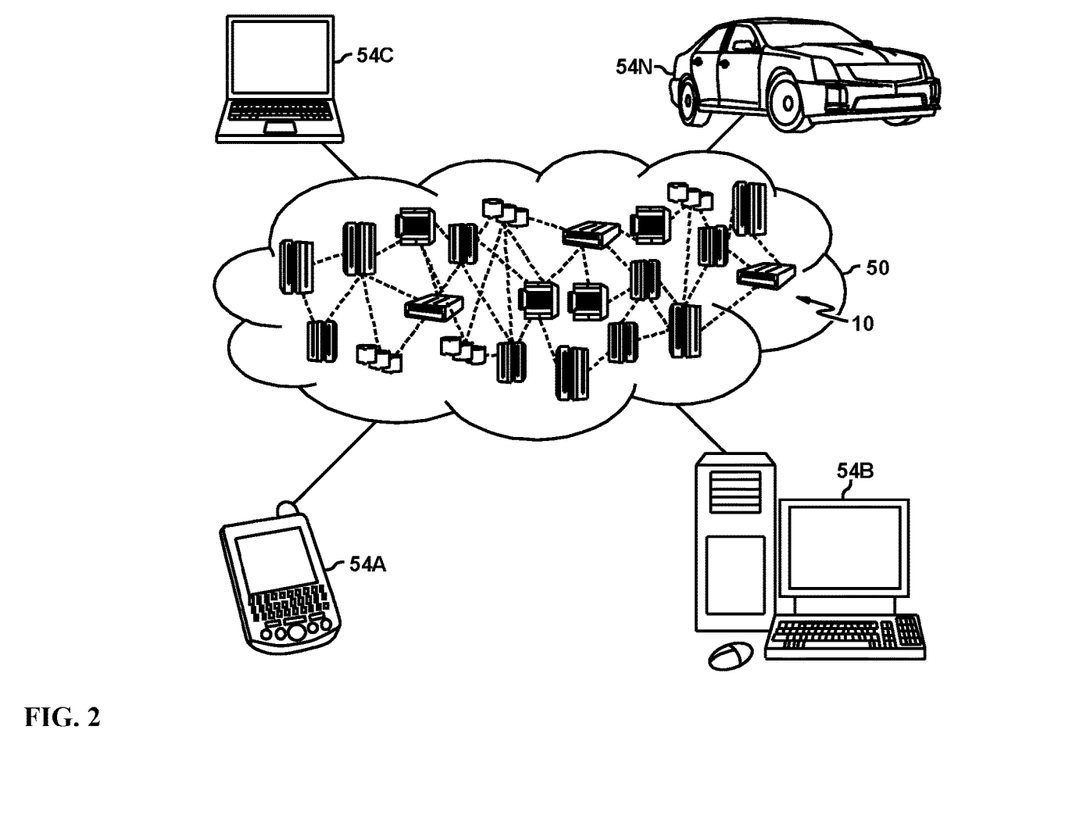
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 3:
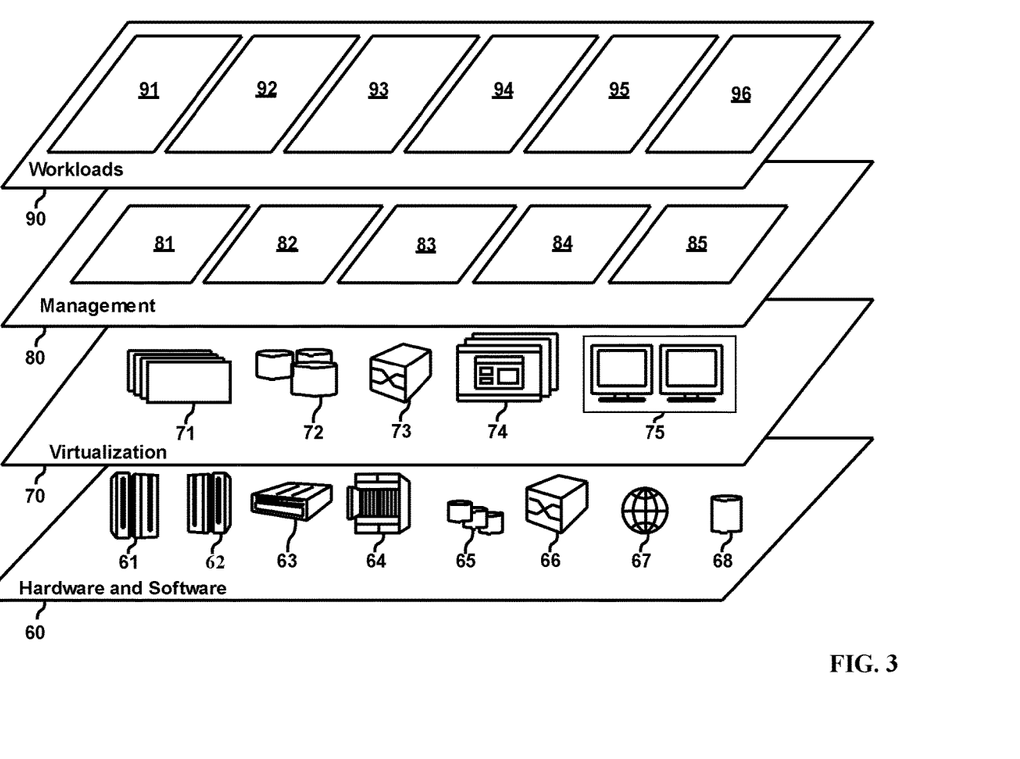
FIG. 3 depicts abstraction model layers according to an embodiment of the present invention.

Referring now to FIG. 3, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service level management 84 may operate in conjunction with the workloads layer 90 to perform CDVS. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and content update on a virtual machine monitoring 96.

Figure 4:
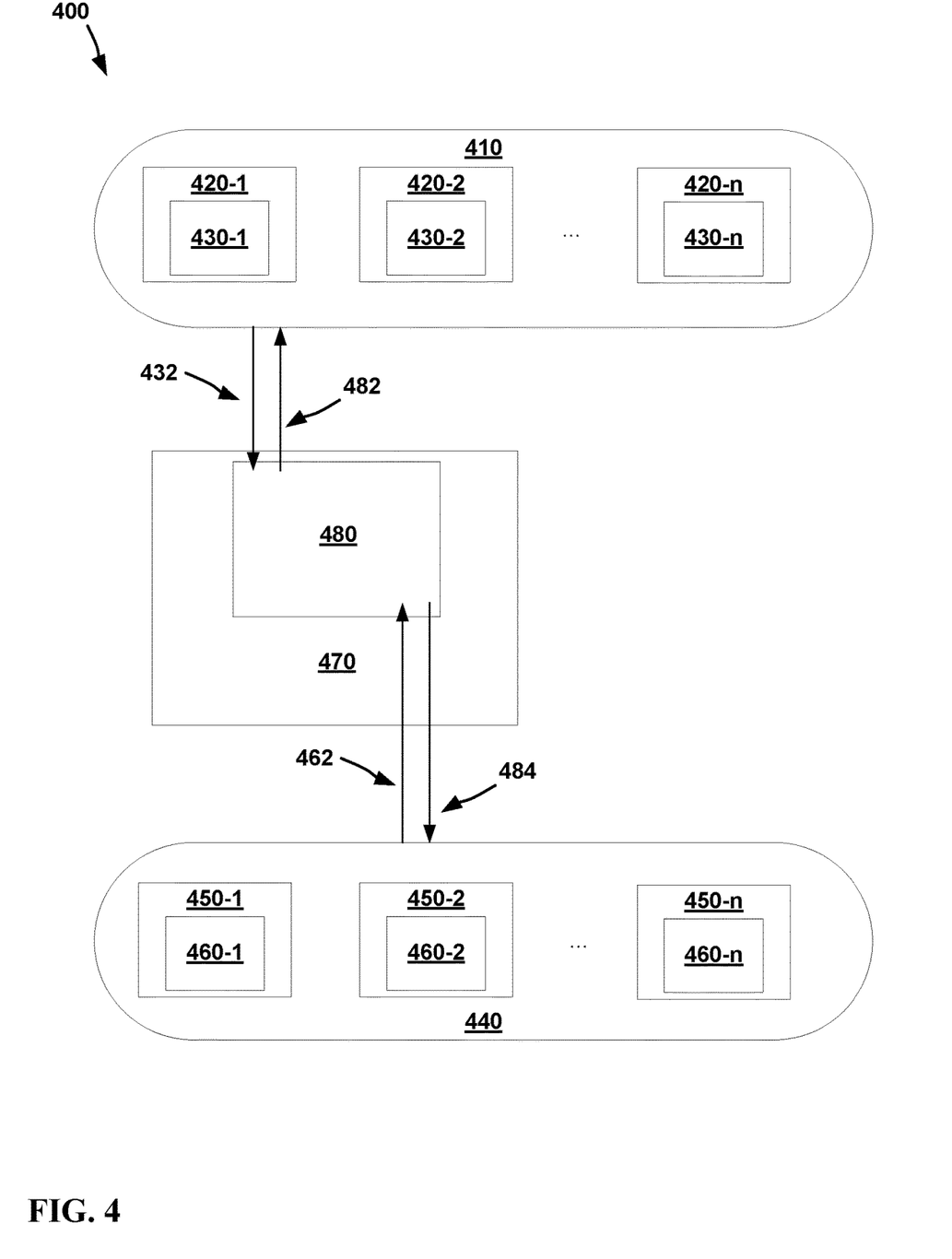
FIG. 4 depicts an example content aware system for operating virtual machine clusters consistent with some embodiments of the disclosure.

FIG. 4 depicts an example content aware system 400 for operating virtual machine clusters consistent with some embodiments of the disclosure. The content aware system 400 may include a first cluster 410, a second cluster 440 and a central server 470 for performing management and administration of the content aware system. The first cluster 410 may include a plurality of first virtual machines 420-1, 420-2, up to 420-n (collectively, 420). The second cluster 440 may include a plurality of second virtual machines 450-1, 450-2, up to 450-n (collectively, 450).

The first cluster 410 may include one or more physical computer systems that host the cluster. The first cluster 410 may be a logical collection of physical computer systems. FIG. 1 depicts an example of a computer system 100 capable of hosting first cluster 410. The first cluster 410 may operate the first virtual machines 420 collectively. For example, a singular accounting software middleware may be operated across first virtual machines 420-1 and 420-2. The first cluster 410 may simultaneously operate the first virtual machines 420 under disparate workloads. For example, first virtual machine 420-1 may host a file sharing suite and first virtual machine 420-2 may host image analysis software.

Each of the first virtual machines 420 may include a first CDVS client 430-1, 430-2, up to 430-n (collectively, 430). The first CDVS clients 430 are configured to perform cognitive agent operations including the monitoring and collection of content from the respective first virtual machines 420. For example, first CDVS 430-2 may detect changes or updates by continuously or periodically scanning first virtual machine 420-2. The data collected may be transmitted at 432 to the central server 470.

Similarly, second cluster 440 may include one or more physical computer systems that host the second virtual machines 450. Each of the second virtual machines 460 may include a second CDVS client 460-1, 460-2, up to 460 (collectively, 460). The second CDVS clients 460 are configured to perform cognitive agent operations including the monitoring and collection of content from the respective second virtual machines 450. For example, second CDVS 450-2 may detect changes or updates by continuously or periodically scanning second virtual machine 460-2. The data collected may be transmitted at 462 to the central server 470.

The central server 470 may be a computer system configured to perform hosting, administration, and coordination of virtualization environments. For example, an administrative interface may operate on central server 470 to allocate computer resources to cluster 410 and cluster 440. A CDVS cognitive agent 480 may operate on central server 470. In some embodiments, CDVS cognitive agents may operate on each virtual machine (e.g., first virtual machines 420, second virtual machines 450). The CDVS cognitive agent 480 may receive the updated content scans from the clusters 410 and 440. The CDVS cognitive agent 480 may be configured to generate insights into scanned data to detect individual and cumulative changes to the content of a given cluster. If the security level changes on an individual virtual machine, the CDVS cognitive agent 480 may instruct the virtual machines to update the security level. For example, at 482 the CDVS cognitive agent 480 may communicate to first virtual machines 420 to increase or decrease the security level based on insights identified from received content. If the security level changes based on a combination of virtual machines within a cluster, the CDVS cognitive agent 480 may instruct the virtual machines to update the security level. For example, at 484 the CDVS cognitive agent 480 may receive from second CDVS client 460-1 content updates, and from second CDVS client 460-2 content information. Based on the changes to the content on second virtual machine 450-1 in relation to existing content on second virtual machine 450-2, the CDVS cognitive agent 480 may determine a change in security settings and communicate the change at 484 to the second virtual machines 450.

In some embodiments, the CDVS clients 430 and 460 may be programmed to perform various analysis outside of the CDVS cognitive agent 480. The CDVS clients 430 and 460 may first analyze content of the virtual machines 410 and 440 to generate a new security level. For example, if certain insights generated by the credit card history lead to disclosing the medical ailment of an individual, then the insights (and the content that was the basis of the insights) would be protected to comply with medical data protection laws, such as the Health Insurance Portability and Accountability Act (HIPAA). The CDVS clients 430 and 460 may also quarantine content and generated insights by providing limited access to the content and insights (e.g., admin only access, access to a user that created the data). The CDVS clients 430 and 460 may also transmit the new security level of a given virtual machine (420 and 450, respectively) to the CDVS cognitive agent 480. The CDVS clients 430 and 460 may also receive instructions from the CDVS cognitive agent 480 on security settings to apply on the clusters 410 and 440, respectively. In some embodiments, if the current security setting on a given system is greater than the security requirements for the insights, no action may be taken. If the current setting on the system are deficient to the identified security level necessary to protect the content (e.g., a security gap), then appropriate action may be performed (e.g., adjusting security settings, notifying an admin of new security settings to be applied). In some embodiments, the CDVS clients 430 and 460 may after updated security setting are applied (or if an admin rejects the suggestion to change security settings), any previously quarantined data may be unquarantined and be accessible to all who possess the appropriate credentials.

In some embodiments, the CDVS cognitive agent 480 may work in concert with the CDVS clients 430 and 460 and may react to the information provided at 432 and 462. For example, the CDVS cognitive agent 480 may process data/insights obtained from the CDVS clients 430 and 460. The CDVS cognitive agent 480 may also process the new security settings proposed by the CDVS clients 430 and 460 by looking at the data/insights of the virtual machines 420 and 450. The CDVS cognitive agent 480 may analyze the data/insights generated across a given cluster 410 and 440 and come up with a security level (e.g., one or more suggestions to various security settings). This security level may or may not be the same security level as it existed previously. In some embodiments, the CDVS cognitive agent 480 may compare the old and new security level and see which is more stringent. The CDVS cognitive agent 480 may send the more stringent security policy to be applied to the end point cognitive agents, or may suggest the new security policy to an administrator.

In some embodiments, the 400 may operate based on decentralized logic. For example, the CDVS clients 430 and 460 across virtual machines 420 and 450, respectively, may communicate utilizing cluster protocols or communicate directly regarding the various insights and security settings (e.g., utilizing peer-to-peer communication). The CDVS clients 430 and 460 may directly apply security settings based on insights and content analysis. A decentralized environment may require the insights and content to be propagated across a given cluster (e.g., first virtual machines 420 of cluster 410) until all virtual machines in the given cluster have the same generated insights. As virtual machines are added to a given cluster and treated as a source of new data, the security setting of the existing virtual machines may be increased for a short time. After a cognitive analysis of the cumulative insights across the given cluster, and the newly added virtual machine, a decision may then be made regarding the effect of the newly added virtual machine to a given cluster. For example, before a first virtual machine 420-5 is migrated into cluster 410, its insights and security level are conveyed to existing first CDVS clients 430. The first CDVS clients 430 may scan for content of a newly migrated first virtual machine 420-5 and re-evaluate the security settings. A new first CDVS client 430-5 may be instantiated on the newly migrated first virtual machine 420-5 and an updated security setting may be implemented. Until the security of cluster 410 is reevaluated, first virtual machine 420-5 may be placed in a quarantine zone.

Figure 5:
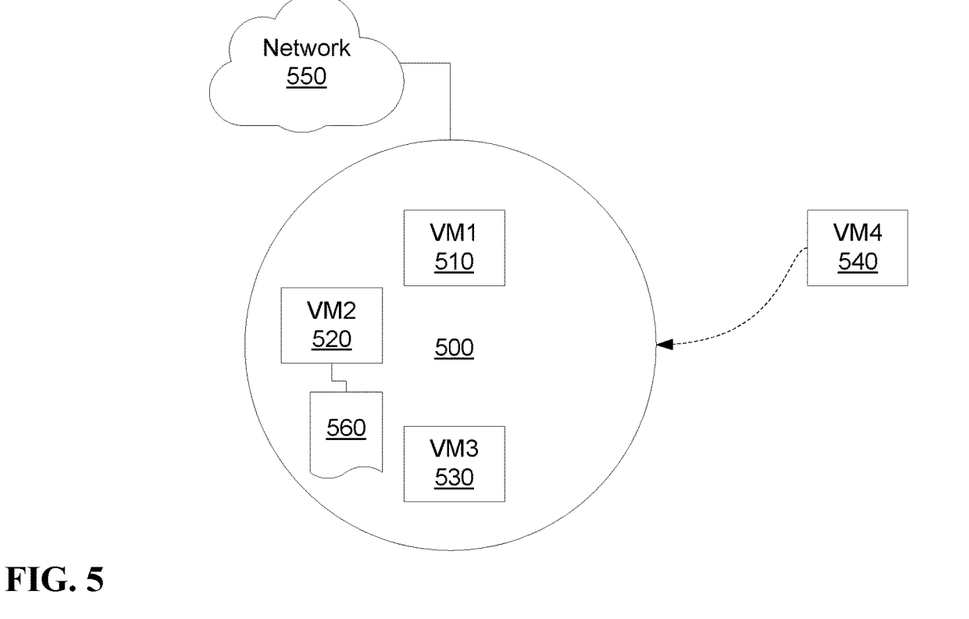
FIG. 5 depicts an example cluster configured to elevate security settings consistent with some embodiments of the disclosure.

FIG. 5 depicts an example cluster 500 configured to elevate security settings consistent with some embodiments of the disclosure. Cluster 500 may comprise one or more virtual machines 510, 520, and 530. Virtual machines 510, 520, 530, and 540 may be related to cluster 500. For example, these virtual machines may be related to cluster 500 by being one of the existing virtual machines (e.g., 510, 520, and 530) of the cluster or by being added to the cluster (e.g., 540). The cluster 500 may implement CDVS to increase the security level of one or more of the virtual machines 510, 520, and 530, based on changes to the cluster. In a first scenario, virtual machine 540 may be added to the cluster. Based on scanning the content of virtual machines 510, 520, and 530, and also the content of newly added virtual machine 540, the cluster 500 may increase the security settings. In a second scenario, virtual machine 520 may generate new data 560. The newly generated data may be an analysis of information that is otherwise benign but may ultimately be considered private data based on content analysis of the CDVS. The cluster 500 may increase the security settings based on the newly generated data 560. In some embodiments, upon new data 560 entering the cluster 500, such new data 560 may be quarantined and not visible to all (except, e.g., the admin or owner) until the security settings of the cluster 500 is changed (if required) or is decided to remain the same. In a third scenario, cluster 500 may increase the security settings of virtual machines 510, 520, and 530 responsive to being placed on a network 550 with outside access to a public network (i.e., the Internet).

Figure 6:
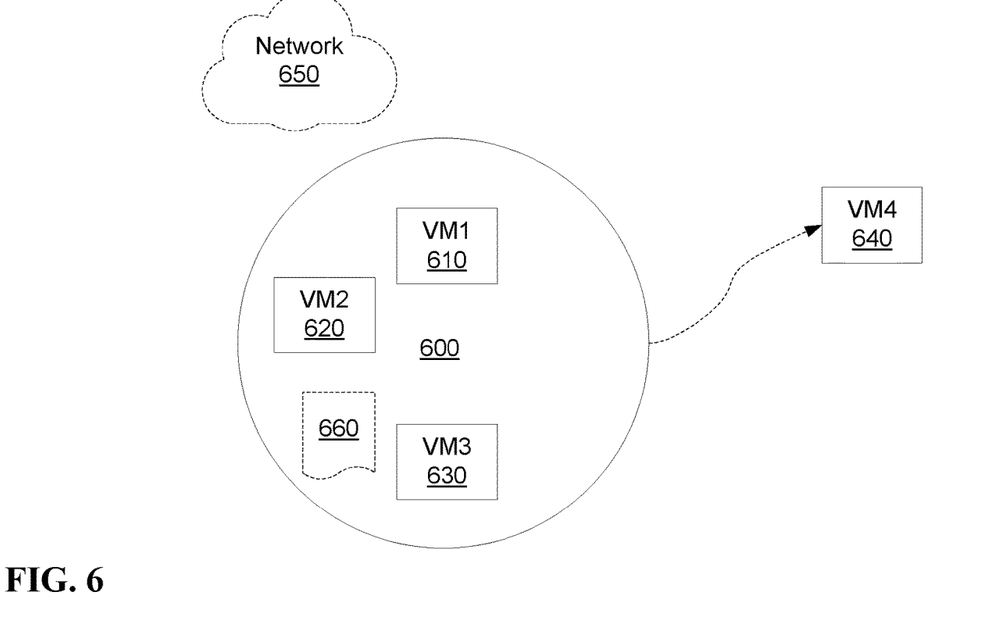
FIG. 6 depicts an example cluster configured lower security settings consistent with some embodiments of the disclosure.

FIG. 6 depicts an example cluster 600 configured with lower security settings, consistent with some embodiments of the disclosure. Cluster 600 may comprise one or more virtual machines 610, 620, and 630. Virtual machines 610, 620, 630, and 640 may be related to cluster 600. For example, a given virtual machine may be related to cluster 600 by being one of the existing virtual machines (e.g., 610, 620, and 630) of the cluster, or by being removed from the cluster (e.g., 640). The cluster 600 may implement CDVS to increase the security level of one or more of the virtual machines 610, 620, 630, and 640 based on changes to the cluster. In a first scenario, virtual machine 640 may be removed from the cluster. Based on scanning the content of virtual machines 610, 620, 630, and also the newly removed content of newly removed virtual machine 640, the cluster 600 may decrease the security settings. In a second scenario, virtual machine 630 may delete data 660. The newly deleted data may change the makeup of content on the cluster 600. The new content makeup of the cluster 600, CDVS may determine that the new content makeup of cluster 600 is no longer private. In a third example, cluster 600 may decrease the security settings of virtual machines 610, 620, and 630 responsive to being removed from a network 650 (e.g., a network connected to other virtual machines handling private data (not depicted)).

Figure 7:
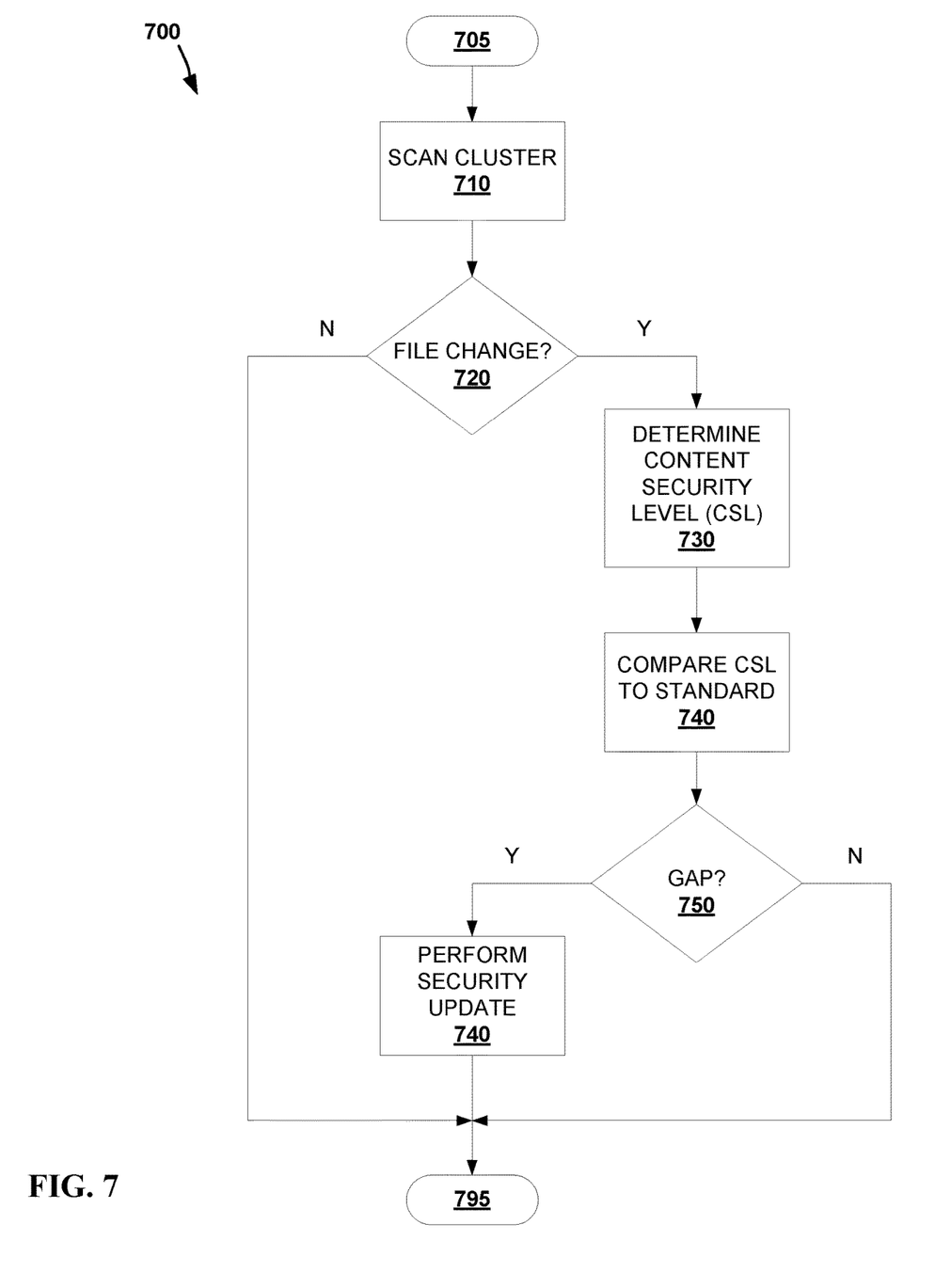
FIG. 7 depicts an example method of performing CDVS consistent with some embodiments of the disclosure.

FIG. 7 depicts an example method 700 of performing CDVS consistent with some embodiments of the disclosure. Method 700 may be performed by a computer system. For example, computer system 100 depicted in FIG. 1 may operate to perform one or more CDVS operations. Certain operations of method 700 may be performed by a first computing device, and other operations performed by a second computing device: for example, a first CDVS client operating on a first device and a second CDVS client operating on a second device.

From start 705, method 700 begins by scanning all of the virtual machines of a cluster at 710. The scanning of the cluster may include monitoring for an update to data that exists on a given virtual machine of the cluster. For example, if through an update new content is added to a file, the scanning may detect changes. In another example, if a new virtual machine is added to the cluster, the scanning may detect the content files located on the newly added virtual machine. The newly added files may be considered a change of the content or an updated content.

If there is a change detected of a first content file (720:Y), then the content-based security level of the cluster may be determined at 730. The content-based security level may be determined based on analysis of the content that has been updated. For example, content may be analyzed by performing natural language processing on the content of the virtual machines. The content-based security level may be determined based on analysis of the content that exists on the rest of the cluster. For example, the content may be analyzed by performing analysis on data that exists on virtual machines other than the updated data. In another example, the content may be analyzed by performing analysis on data that already exists as well as the newly updated content, either on a single virtual machine, or across virtual machines of the cluster. The data analysis could be based on data belonging to any user or can be in any form (e.g., XML, SQL database, log files, etc.). Appropriate pre-defined models may be used to generate insights based on the type of data. The models used to generate the insights may be pre-trained in specific industry areas to generate insight related to that industry. The operation of the training of models and the insights generation process that is used to determine the security level of a cluster may be based on an organizational policy that would use the proposed solution.

At 740, the determined content-based security level may be compared to a security level standard. The security level standard may be a preexisting policy suite, ruleset, or permission settings across various computers and virtual machines of the cluster. Based on the comparison, a security gap may be identified. For example, based upon data being truncated within a log file, a determined content-based security level may be 3 out of 10, and the existing security level standard of the cluster may be 7 out of 10. In a second example, based upon data being generated within a content store of a virtual machine, a determined content-based security level may be 5 out of 10, and the existing security level standard of the cluster may be 4 out of 10.

If there is a gap identified (750:Y), then an update to a security setting of the cluster may be performed at 740. Performance of the update to a security setting may be changing a file sharing permission setting to remove certain entities from access. Performance of the update to a security setting may be by increasing the strength or complexity of an encryption algorithm of the cluster. Performance of an update to a security setting may be generating a notice of security setting adjustments and transmitting or communicating the notice to an administrative user.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   scanning, by a first computer system, a cluster including a plurality of virtual machines;
   detecting, based on the scanning the cluster of virtual machines, a first content change of the cluster that includes at least one of:
     an update to data of at least one file on at least a first one of the virtual machines,
     adding or removing at least one file from the first one of the virtual machines, and
     an addition of at least one virtual machine to the cluster or a removal of at least one virtual machine from the cluster;
   determining, in response to the detecting of the first content change, a content-based security level of the cluster;
   comparing the determined content-based security level of the cluster to a security level standard of the cluster;
   determining a difference between the determined content-based security level and the security level standard; and
   performing, in response to determining the difference, an update to a security setting of the cluster.

2. The method of claim 1, wherein the performing of the update to the security setting of the cluster includes updating a security setting to a same level for each of the virtual machines of the cluster.

3. The method of claim 1, wherein the performing the update to the security setting of the cluster includes updating a security setting of a virtual machine of the cluster other than the first virtual machine.

4. The method of claim 1, wherein the scanning of the cluster includes monitoring for a given virtual machine to be added to the cluster, and wherein the first virtual machine is added to the cluster.

5. The method of claim 1, wherein the first content change is changing a sharing permission of the at least one file.

6. The method of claim 1, wherein the scanning of the cluster includes monitoring for a given virtual machine to be removed from the cluster, and wherein the first virtual machine is removed from the cluster.

7. A system, the system comprising:
   a memory, the memory containing one or more instructions; and
   a processor, the processor communicatively coupled to the memory, the processor, in response to reading the one or more instructions, configured to:
     scan a cluster including a plurality of virtual machines;
     detect, based on the scanning the cluster of virtual machines, a first content change of the cluster that includes at least one of
       an update to data of at least one file on at least a first one of the virtual machines,
       adding or removing at least one file from the first one of the virtual machines, and
       an addition of at least one virtual machine to the cluster or a removal of at least one virtual machine from the cluster;
     determine, in response to the detecting of the first content change, a content-based security level of the cluster;
     compare the determined content-based security level of the cluster to a security level standard of the cluster;
     determining a difference between the determined content-based security level and the security level standard; and
     perform, in response to determining the difference, an update to a security setting of the cluster.

8. The system of claim 7, wherein performing the update to the security setting of the cluster includes updating a security setting to a same level for each of the virtual machines of the cluster.

9. The system of claim 7, wherein the performing of the update to the security setting of the cluster includes updating a security setting of a virtual machine of the cluster other than the first virtual machine.

10. The system of claim 7, wherein the scan of the cluster includes monitoring for a given virtual machine to be added to the cluster, and wherein the first virtual machine is added to the cluster.

11. A computer program product, the computer program product comprising a computer readable storage medium having program instructions embodied therewith, the program instructions configured to:
    scan, by a first computer system, a cluster including a plurality of virtual machines;

detect, based on the scanning the cluster of virtual machines, a first content change of the cluster that includes at least one of:
  an update to data of at least one file on at least a first one of the virtual machines,
  adding or removing at least one file from the first one of the virtual machines, and
  an addition of at least one virtual machine to the cluster or a removal of at least one virtual machine from the cluster;
determine, in response to the detecting the first content change, a content-based security level of the cluster;
compare the determined content-based security level of the cluster to a security level standard of the cluster;
determining a difference between the determined content-based security level and the security level standard; and
perform, in response to determining the difference, an update to a security setting of the cluster.

12. The computer program product of claim 11, wherein performing the update to the security setting of the cluster includes updating a security setting to a same level for each of the virtual machines of the cluster.

13. The computer program product of claim 11, wherein the performing the update to the security setting of the cluster includes updating a security setting of a virtual machine of the cluster other than the first virtual machine.

14. The computer program product of claim 11, wherein the scanning of the cluster includes monitoring for a given virtual machine to be added to the cluster, and wherein the first virtual machine is added to the cluster.

15. The computer program product of claim 11, wherein the first content change is changing a sharing permission of the at least one file.

* * * * *